United States Patent [19]

Zhang et al.

[11] Patent Number: 5,325,740
[45] Date of Patent: Jul. 5, 1994

[54] ARRANGEMENT FOR CONTROLLING THE OUTPUT POWER OF A DRIVE UNIT OF A MOTOR VEHICLE

[75] Inventors: Hong Zhang, Bietigheim-Bissingen; Martin Streib, Vaihingen/Enz, both of Fed. Rep. of Germany

[73] Assignee: Robert Bosch GmbH, Stuttgart, Fed. Rep. of Germany

[21] Appl. No.: 923,582

[22] Filed: Aug. 3, 1992

[30] Foreign Application Priority Data

Aug. 2, 1991 [DE] Fed. Rep. of Germany ....... 4125574
Apr. 2, 1992 [DE] Fed. Rep. of Germany ....... 4210956

[51] Int. Cl.$^5$ .............................................. F16H 59/14
[52] U.S. Cl. ..................................... 477/110; 477/102
[58] Field of Search .................. 74/857, 859, 860, 889

[56] References Cited

U.S. PATENT DOCUMENTS

| | | | |
|---|---|---|---|
| 4,724,723 | 2/1988 | Lockhart et al. | 74/857 X |
| 4,809,660 | 3/1989 | Marsh et al. | 74/859 X |
| 4,819,777 | 4/1989 | Yasue et al. | 74/857 X |
| 4,881,428 | 11/1989 | Ishikawa et al. | 74/859 |
| 4,926,636 | 5/1990 | Tadokoro et al. | 74/860 X |
| 4,953,679 | 9/1990 | Okino | 192/0.096 |
| 5,065,319 | 11/1991 | Iwatsuki et al. | 364/431.03 X |
| 5,105,926 | 4/1992 | Yoshimura et al. | 192/0.032 |

FOREIGN PATENT DOCUMENTS 0413031 2/1991 European Pat. Off. .
3843060 7/1989 Fed. Rep. of Germany .
61-223244 10/1986 Japan .

Primary Examiner—Dirk Wright
Attorney, Agent, or Firm—Walter Ottesen

[57] ABSTRACT

The invention is directed to an arrangement for controlling the output power of the drive unit of a motor vehicle. The drive unit includes a drive motor for generating an output torque, a transmission unit and a power transmitting device including a torque converter interconnecting the drive motor and transmission unit for transmitting torque therebetween with the power transmitting device having an output torque, the transmission unit having a transmission ratio and the torque converter having an amplification. The arrangement includes a circuit for supplying a signal indicative of a driver command and a control apparatus. The control apparatus determines a desired value for the output torque of the drive motor occurring at the output end of the power transmitting device and determines a desired value for a drive motor torque from the desired value of the output torque and from variables representing the transmission ratio of the transmission unit and the amplification of the torque converter. A desired value is provided for the drive motor torque to adjust the desired value of the output torque. The apparatus controls the drive motor torque in accordance with the desired value.

11 Claims, 3 Drawing Sheets

ARRANGEMENT FOR CONTROLLING THE OUTPUT POWER OF A DRIVE UNIT OF A MOTOR VEHICLE

BACKGROUND OF THE INVENTION

An arrangement for controlling the output power of a drive unit of a motor vehicle is disclosed in published German patent application 4,037,237. Here, for the open-loop control of the output power of a drive unit, a drive torque desired value corresponding to the driver's request is pregiven and, with the input of an engine torque desired value, the engine torque is adjusted by influencing output parameters of the engine while considering transmission ratios corresponding to the desired value of the drive torque. The engine torque desired value is determined on the basis of the transmission ratio, output torque desired value and measured output engine speed from a characteristic field. The computation of the desired engine torque takes place in such a manner that the output torque which adjusts is made available independently of the gear in which the transmission is placed corresponding to the accelerator pedal position.

The following situation results with an automatic transmission having a converter. The desired value of the output torque is determined from the output engine speed and the accelerator pedal position and requires a certain desired torque at the turbine wheel of the converter in dependence upon the ratio of the gear which has been shifted into place. To obtain this desired turbine torque, a specific desired engine torque is required at the converter input in dependence upon the converter amplification. In order to obtain an output torque independent of the gear position and converter amplification, the converter amplification must be included in the determination of the desired engine torque. A concrete procedure for determining the converter amplification is not provided in the above-mentioned published German patent application.

In the electronic control of transmissions, it is known to compute a theoretical desired acceleration of the motor vehicle from engine torque, gear position and converter slip which is directly connected to the converter amplification. The slip of the converter can then be determined from a characteristic field as a function of the engine speed and engine torque.

The use of methods of this kind for determining the converter slip or the converter amplification resulting therefrom is however not suitable when the engine torque is unknown or when a desired value for the engine torque must be computed in advance in order to obtain the pregiven drive torque. Therefore, the necessary engine torque cannot be made available in all cases in a satisfactory manner with a view to the desired output torque value representing the request of the driver. An exact determination of the desired engine torque in accordance with the methods outlined above would further have an iterative operating procedure with corresponding complexity as the result since the converter slip or the converter amplification are dependent on the engine torque which is a variable which is sought.

SUMMARY OF THE INVENTION

It is an object of the invention to provide an arrangement for controlling the output power of a drive unit of a motor vehicle and to provide improvements with respect to making the engine torque available.

This is achieved in that the determination of the desired value for the engine torque to be made available takes place on the basis of at least one desired value o#an operating variable of the drive unit with the value of this desired value defining a measure for the value which will result as a consequence of adjusting the desired value of the output torque.

The procedure provided by the invention affords the advantage that the desired value for the engine torque can be computed while considering the converter amplification in a simple manner.

An essential advantage is that at the time point of computing the required engine torque, this torque is already undertaken on the basis of the converter amplification adjusted with the computed engine torque.

In this way, the output determining parameters of the engine can be adjusted to the future requirements adapted in correspondence to the request of the driver. This makes possible a precise preparation of the output desired torque corresponding to the request of the driver.

The procedure provided by the invention permits a direct computation of the engine torque desired value which is sought without taking iterative computation steps and a computation intensive effort.

The use of turbine rotational speed and turbine torque desired value of the converter or variables representing the latter are advantageous for computing the converter amplification.

In another embodiment, it is advantageous as an alternative to undertake the computation of the converter amplification based on an interpolation from a characteristic curve which defines the converter amplification as a function of the quotient of the turbine rotational speed and engine speed. With this alternative, the computation of the converter amplification is not carried out by means of a two-dimensional characteristic field; rather, by means of a one-dimensional characteristic curve without it being necessary to accept a reduction in precision. Furthermore, this procedure permits to detect the actual measured values of the turbine rotational speed and the engine speed at the time point of the computation so that the converter amplification corresponds precisely to the instantaneous amplification of the converter. In this way, the dynamic of the converter is additionally considered when making the computation of the required engine torque.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
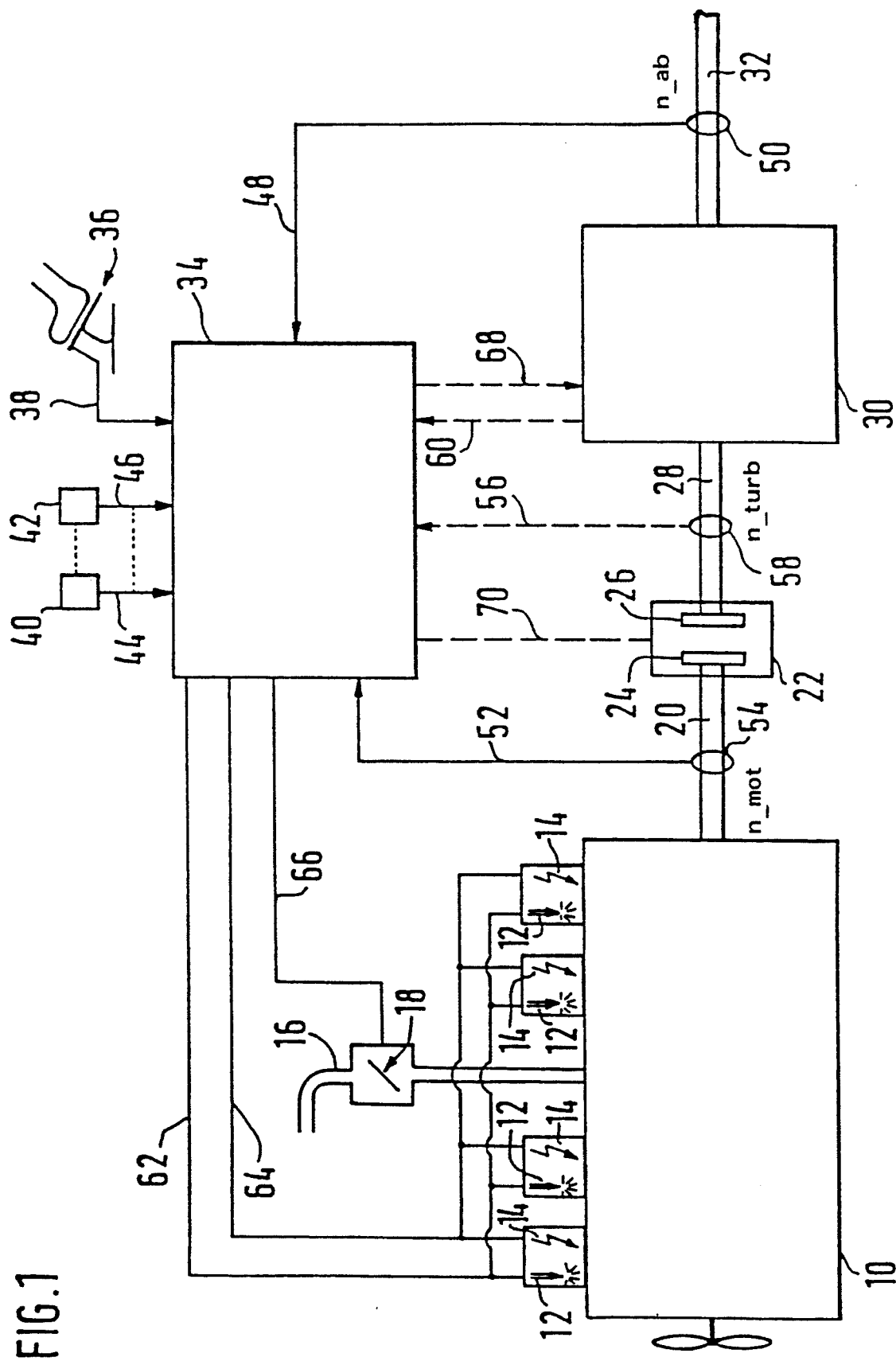
FIG. 1 shows a block diagram of an arrangement for tile open-loop control of the output power of a drive unit of a motor vehicle.

In FIG. 1, reference numeral 10 identifies a schematic representation of a multi-cylinder internal combustion engine having a controllable device 12 for metering fuel and a controllable device 14 for ignition. In addition, an air intake system 16 is provided which is equipped with an electronically drivable throttle flap 18. The output shaft 20 (crankshaft) of the internal combustion engine 10 connects the engine 10 to a converter 22 and there with a pump wheel 24. The turbine wheel 26 of the converter 22 is connected to the shaft 28 which is connected to the transmission 30. The output shaft 32 of the transmission 30 defines the actual drive of the motor vehicle. The shafts identified above can, in other embodiments, be shaft systems. Transmission 30, converter 22 and the shafts 20, 28 and 32 conjointly defined the power transmission unit of the motor vehicle.

Furthermore, an open-loop control unit 34 is provided for carrying out the open-loop control tasks with the control unit 34 being in the form of a central control apparatus or being configured as several interconnected control apparatus. This control unit is supplied with the following input signals. From an operator-controlled element 36 actuated by the driver, a signal corresponding to the driver's request is supplied via a signal line 38. Operating variables of the engine and motor vehicle are supplied from measuring devices 40 to 42 via connecting lines 44 to 46, respectively. These operating variables are for example engine temperature, road speed, etcetera. An input line 48 connects the control unit 34 to a measuring unit 50 which detects the output rotational speed of the transmission.

As an alternative, measuring devices can be provided for detecting variables representing the output rotational speed such as wheel rotational speed which supply their measured values via line 48 to the control unit 34. A connecting line 52 connects the control unit 34 to a measuring device 54, which detects the engine speed or a measured value which represents the engine speed, in the region of the output shaft 20. In some embodiments, an input line 56 can be additionally advantageously provided which connects the control unit 34 to a measuring unit 58 for detecting the turbine rotational speed of the converter 22 or a variable representing this speed in the region of the shaft 28. A further connecting line 60 can announce from the transmission 30 the actual gear transmission, which has been adjusted or set and the status of the coverter coupling to the control unit 34.

The control unit 34 forms control commands in correspondence to its programs in dependence upon the variables supplied for the controllable characteristic variables for the drive unit such as engine power (for example, fuel metering, ignition time point and/or throttle flap position), gear transmission or converter coupling condition. Control signals for controlling the engine power are supplied to the correspondingly controllable arrangements via the connecting lines 62, 64 and 66 in dependence upon the embodiment; whereas, the transmission control signals and converter coupling control signals (insofar as a converter coupling is present) are supplied via connecting lines 68 and 70 to transmission 30 and converter 22, respectively.

The description which follows can, in addition to the configuration mentioned in the illustrative embodiment of an internal combustion engine having automatically controllable transmission, converter and converter coupling also be applied to different types of force transmission units.

The procedure provided by the invention is especially suitable also in combination with alternative drive concepts such as electric motors where the motor torque or the motor power can then be adjusted via the corresponding parameters.

With the request of the driver detected by the operator-actuated element 36, the control unit 34 forms an output desired torque while considering the output rotational speed of the drive unit detected by the measuring device 50. The output desired torque is made available at a the shaft 32 by means of the drive unit to fulfill the driver's request. This output desired torque is converted by the control unit into an optimal transmission ratio and a desired engine torque. The engine torque is made available on the basis of the detected operating variables by adjusting the fuel metering for diesel engines and by adjusting the metering of air in Otto engines and/or, if required, the ignition time point at the crankshaft 20 of the engine so that, together with the adjusted transmission ratio, the desired output torque is made available at the output shaft 32 of the drive unit.

The problem outlined above occurs with the computation of the desired engine torque from the desired output torque. The engine torque required for making available the output torque desired value must already consider the converter amplification of the converter 22 which is to be adjusted as a consequence of this engine torque to be computed. The converter amplification is itself dependent on the engine torque. An engine torque is required at the crankshaft 20 in dependence upon the converter amplification. This engine torque, compared to the turbine torque occurring at the input shaft of the transmission, requires an engine torque weighted by the factor of the converter amplification. To ensure a satisfactory open-loop control of the drive unit, a converter amplification must be considered which becomes adjusted for the given conditions when the output torque has reached its desired value.

Figure 2:
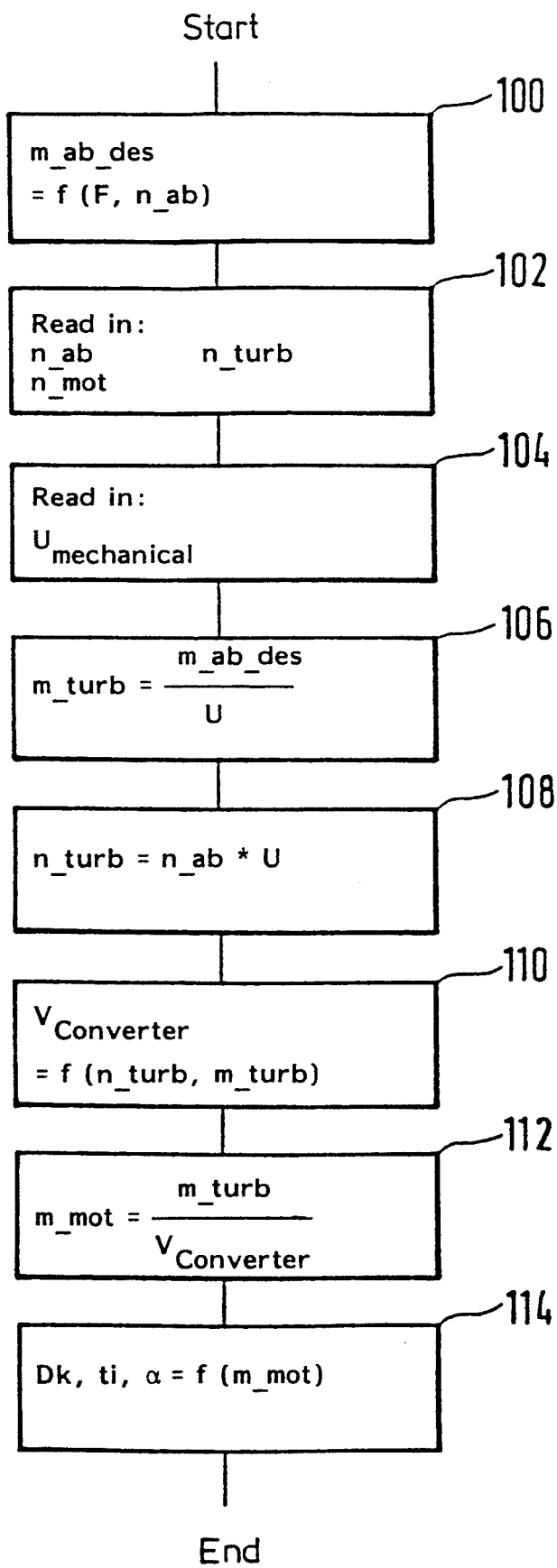
FIG. 2 shows, on the other hand, a flowchart which illustrates the procedure pursuant to the invention by means of which the determination and adjustment of the engine torque is made; and, FIG. 3 is a flowchart of a further embodiment of a procedure which can be followed in accordance with the invention.

The procedure to be followed when determining and making available the desired engine torque is the same as with respect to FIG. 2. The measured variables provided there are advantageously used in an embodiment. In other embodiments, the use of other variables can be advantageous which have a fixed relationship with the variables identified below.

After the start of the subprogram called up cyclically, an output desired torque m_ab_des is formed in a first step 100 on the basis of the driver request F while considering the output rotational speed n_ab, for example from a characteristic field. Thereafter, in step 102, the rotational speeds which are available are read in. This is at least the output rotational speed n_ab of the output shaft 32, the engine speed n_mot of the engine shaft 20 or, additionally, depending on the type of the force transmission unit, the turbine rotational speed n_turb of the shaft 28. Thereafter, in step 104, the transmission ratio U of the transmission 30 is read in. This is the rotational speed transmission ratio of the transmission 30 which is determined either from fixedly stored values for the individual gear stages or from quotient formation of the input and output rotational speeds of the transmission 30 (n_turb, n_ab). Thereafter, in step 106, the computation of the turbine torque desired value m_turb follows, which must occur at the shaft 28 while considering the transmission ratio in order to make available the desired output torque at the shaft 32. The computation of the turbine desired torque m_turb is then carried out by quotient formation from the output desired torque m_ab_des and the transmission ratio U.

If a force transmission unit is used without the possibility of detecting the turbine rotational speed n_turb of the shaft 28, then ill step 108, the turbine rotational speed n_turb is computed from the product of the output rotational speed n_ab and the transmission ratio U.

Thereafter, in step 110, the determination of the converter amplification V of the converter takes place by means of a characteristic field interpolation in dependence upon turbine rotational speed n_turb as well as the desired value of the turbine torque m_turb. The determined converter amplification V defines a value in dependence upon the desired turbine torque necessary for making available the desired output torque as well as the instantaneous turbine rotational speed. In this way, with the following computation of the desired engine torque, information can be introduced as to the converter amplification, which can be expected with the change of engine power for adjusting the desired engine torque or desired output torque, and therefore the dependency of the engine torque of the converter amplification.

The characteristic field for determining the converter amplification in step 110 shows the following principle characteristic. The converter amplification increases in amount generally at constant turbine torque at low turbine rpm; whereas, the converter amplification drops for increasing rotational speed. At the other end, for constant turbine rotational speed with increasing turbine torque, an increasing slip of the converter has to be provided, that is an increasing converter amplification. In accordance with the latter, the converter amplification increases with increasing turbine desired torque at constant turbine rotational speed.

Figure 3:
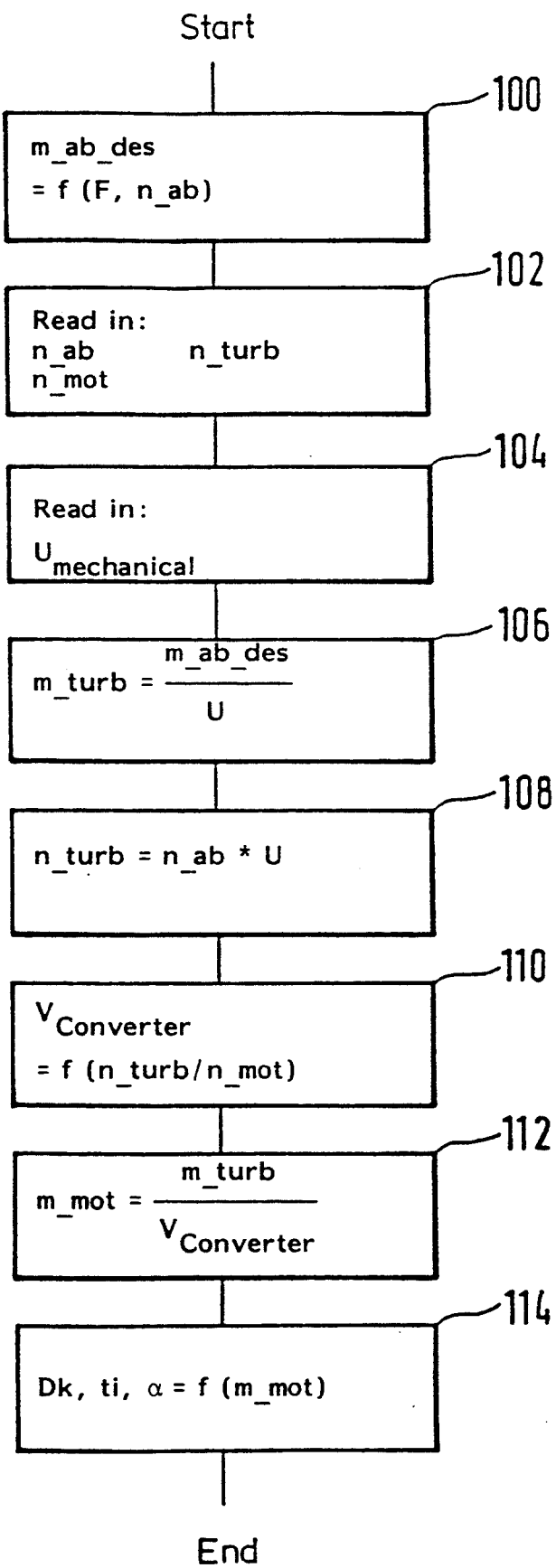

As an alternative to that described above and as shown in FIG. 3, the converter amplification can be obtained from a characteristic curve interpolation in an advantageous manner in another embodiment in step 110. The characteristic curve defines the converter amplification as a function of the quotient of turbine rotational speed and engine speed. The quotient is formed from the turbine rotational speed and engine speed detected in step 102 and, according to known interpolation computations, the actual converter amplification is computed. If the converter is bridged by a converter coupling which is possibly present, then the converter amplification is set to one. The quotient of the turbine rotational speed and engine speed corresponds essentially to the slippage (slippage=1−n_turb/n_mot) of the converter. It is therefore especially advantageous to compute the converter amplification as a function of this slip. Since the turbine rotational speed and the engine speed are measured at the time point of the computation (step 102), the computed converter amplification corresponds precisely to the instantaneous amplification of the converter (step 111). In this way, the dynamic of the converter is also considered in the computation of required engine torque in the following step 112.

The characteristic curve can either be experimentally determined for each type of converter or is known. The converter amplification becomes essentially less with decreasing slip (quotients become larger).

In the next step 112, the desired engine torque is then computed from the turbine torque and the converter amplification. The computation takes place by means of the quotients of desired turbine torque and converter amplification. In step 114, the desired engine torque is made available by adjusting the fuel metering (ti) for diesel engines and the throttle flap position (Dk) is adjusted for Otto engines and/or, if required, by the adjustment of the ignition time point. This takes place in this embodiment by means of a characteristic field in that a throttle flap position desired value (Otto engine) is plotted as a function of engine torque desired value, engine speed and, if required, further influencing variables such as engine temperature. For diesel engines, the throttle flap position desired value is replaced by an injection quantity.

Thereafter, the subprogram is ended and at a pre-given time, (approximately every 10 to 100 ms) the subprogram is repeated. With a new run-through, the parameters are newly determined so that an open-loop control of the engine torque is provided for adjusting the desired output torque continuously.

For the case where the converter has an actuable converter coupling, for a closed converter coupling which has the bridging of the converter as a consequence, the value 1 is used for the converter amplification.

In addition, for transmissions wherein the turbine rotational speed is not detected, the computation of the turbine rotational speed in step 108 during a change of gears is not possible so that the procedure pursuant to the invention in this case cannot be carried out during a gear change. A measuring device for detecting the turbine rotational speed and which supplies a corresponding signal to the control unit would however permit the method according to the invention to be carried out even during a change of gears.

If the method is not applied during a change of gears, then the course of the engine torque is controlled for the time of the gear change such that the best possible transition between the engine torque in the old and in the new gear takes place.

In order to consider frictional losses in the transmission, the rotational speed transmission ratio U cannot be used for the computation of the desired turbine torque in accordance with step 106; instead, the effective torque transmission of the transmission is used. However, it is here noted that in step 108 for computing the turbine speed, the rotational speed transmission ratio U is to be used.

The above description of the procedure pursuant to the invention makes clear that the converter amplification tied to the slip of the converter as a function of the input and output rotational speeds can be determined with respect to an output desired torque which is to be adjusted. In this way, a precise determination of the desired engine torque for obtaining the desired output torque is assured so that for the adjustment of the desired engine torque via fuel metering, ignition and/or throttle flap position, an optimal control of the output power of the drive unit is made possible.

It is understood that tile foregoing de script ion is that of the preferred embodiments of the invention and that various changes and modifications may be made thereto without departing from the spirit and scope of the invention as defined in the appended claims.

What is claimed is:

1. In a motor vehicle having a drive unit including a drive motor for generating an output torque, a transmission unit and a power transmitting device including a torque converter interconnecting the drive motor and transmission unit for transmitting torque therebetween with the power transmitting device having an output torque, the transmission unit having a transmission ratio U and the torque converter having an amplification V, an arrangement for controlling the output power of the drive unit, the arrangement comprising:

signal means for supplying a signal indicative of a driver command;

a control apparatus including:

first means for determining a desired value (m_ab_des) for the output torque of said drive motor occurring at the output end of said power transmitting device;

second means for determining a desired value for a drive motor torque (m_mot) from said desired value (m_ab_des) of said output torque and from variables representing said transmission ratio U of said transmission unit and the amplification V of said torque converter;

said second means functioning to provide said desired value for said drive motor torque (m_mot) to adjust said desired value (m_ab_des) of said output torque; and, third means for controlling said drive motor torque (m_mot) in accordance with said desired value (m_ab_des).

2. The arrangement of claim 1, wherein said drive motor is an otto engine having an air supply and said drive motor torque is determined by intervening in the power of said otto engine via a control of said air supply.

3. The arrangement of claim 2, wherein said otto engine has an ignition time point and said drive motor torque is determined by also intervening in the power of said otto engine via a control of said ignition time point.

4. The arrangement of claim 1, wherein said amplification V of the converter is evaluated when computing the drive motor torque.

5. The arrangement of claim 1, wherein said amplification V is determined on the basis of: a variable representing the output rotational speed of the drive unit, the transmission ratio and the desired value of the output torque, the determined value corresponding to said amplification V which can be expected when the drive motor torque is adjusted.

6. The arrangement of claim 1, wherein said amplification V is read out of a characteristic field by means of interpolation.

7. The arrangement of claim 1, wherein said converter has a turbine desired torque and a turbine rotational speed; and, said desired value for the drive motor torque is determined on the basis of said turbine desired torque and said turbine rotational speed of said converter.

8. The arrangement of claim 7, wherein said turbine desired torque is determined from said output desired torque and said transmission ratio U.

9. The arrangement of claim 1, wherein said drive motor is a diesel engine and said drive motor torque is determined by intervening in the power of said diesel engine via an open-loop control of a fuel quantity to be injected for said diesel engine via at least one pregiven characteristic field or a table.

10. The arrangement of claim 1, wherein said drive motor has a speed ration which is used as said transmission ratio or the effective torque transmission of said transmission unit is used as the transmission ratio.

11. The arrangement of claim 7, wherein said amplification V is computed in accordance with a measure of a characteristic, which defines said amplification V as a function of the slip, that is, the quotient of said turbine rotational speed and the speed of said drive motor.

* * * * *

UNITED STATES PATENT AND TRADEMARK OFFICE
CERTIFICATE OF CORRECTION

PATENT NO. : 5,325,740

DATED : July 5, 1994

INVENTOR(S) : Hong Zhang and Martin Streib

It is certified that error appears in the above-identified patent and that said Letters Patent is hereby corrected as shown below:

In column 2, line 6: delete "o#" and substitute -- of -- therefor.

In column 2, line 55: delete "tile" and substitute -- the -- therefor.

In column 3, line 45: delete "coverter" and substitute -- converter -- therefor.

In column 5, line 3: delete "ill" and substitute -- in -- therefor.

In column 6, line 41: between "transmission" (second occurrence) and "is", insert -- UEFF --.

In column 6, line 56: delete "tile" and substitute -- the -- therefor.

In column 6, line 56: delete "de script ion" and substitute -- description -- therefor.

UNITED STATES PATENT AND TRADEMARK OFFICE
CERTIFICATE OF CORRECTION

PATENT NO. : 5,325,740

DATED : July 5, 1994

INVENTOR(S) : Hong Zhang and Martin Streib

It is certified that error appears in the above-indentified patent and that said Letters Patent is hereby corrected as shown below:

In column 8, line 27: delete "ration" and substitute --ratio-- therefor.

Signed and Sealed this

First Day of November, 1994

Attest:

BRUCE LEHMAN

Attesting Officer

Commissioner of Patents and Trademarks